United States Patent

Burch et al.

[11] Patent Number: 5,269,141
[45] Date of Patent: Dec. 14, 1993

[54] HYDRAULIC SAFETY AND REGULATING SYSTEM

[75] Inventors: Edi Burch, Würenlos; Heinz Frey, Menziken, both of Switzerland

[73] Assignee: Asea Brown Boveri Ltd., Baden, Switzerland

[21] Appl. No.: 943,137

[22] Filed: Sep. 10, 1992

Related U.S. Application Data

[63] Continuation of Ser. No. 695,450, May 3, 1991, abandoned.

[30] Foreign Application Priority Data

Jun. 18, 1990 [CH] Switzerland ............... 2023/90

[51] Int. Cl.⁵ ................................ F16D 31/02
[52] U.S. Cl. ............................. 60/406; 91/29; 137/102; 137/613; 251/25
[58] Field of Search ................ 60/403, 406; 91/29, 91/30, 31; 137/102, 613; 251/25

[56] References Cited

U.S. PATENT DOCUMENTS

| | | |
|---|---|---|
| 2,658,484 | 11/1953 | Kenney. |
| 4,353,286 | 10/1982 | Masek et al. ............... 137/613 |
| 4,589,444 | 5/1986 | Wetter ........................... 60/413 |

FOREIGN PATENT DOCUMENTS

| | | |
|---|---|---|
| 0023591 | 2/1981 | European Pat. Off. . |
| 0127027 | 12/1984 | European Pat. Off. . |
| 1551206 | 1/1970 | Fed. Rep. of Germany . |
| 239817 | 3/1946 | Switzerland . |

*Primary Examiner*—Edward K. Look
*Assistant Examiner*—F. Daniel Lopez
*Attorney, Agent, or Firm*—Oblon, Spivak, McClelland, Maier & Neustadt

[57] ABSTRACT

This hydraulic safety and regulating system for a steam feed of a turbine has a rapid-action (4) and a steam regulating valve (3), and a line system monitored by a safety downward-control unit (22). The monitored line system is designed as both a power oil supply and as a safety oil system. This results in a hydraulic safety regulating system which is simple to build and has a reduced number of possible leakage points.

14 Claims, 2 Drawing Sheets

HYDRAULIC SAFETY AND REGULATING SYSTEM

This application is a Continuation of application Ser. No. 07/695,450, filed on May 3, 1991, now abandoned.

BACKGROUND OF THE INVENTION

1. Field of the Invention

The present invention proceeds from a hydraulic safety and regulating system for the steam feed of a turbine in accordance with the first part of claim 1.

2. Discussion of Background

Hydraulic safety and regulating systems are known for the steam feed of a turbine, in which a safety oil circuit is provided. Power oil, which ensures actuation of the drives of rapid-action and steam-regulating valves, is fed in a separate pipeline. The safety oil circuit ensures that in the case of a system failure the turbine can be brought into a safe operating condition. Only as much oil as covers leakage losses in each case is replenished under pressure in the safety oil circuit. The oil escaping through leaks, and the power oil leaving the drives are collected in a return line and led into an oil draining device. A pump pressurizes the oil and conveys it once again out of the oil draining device into the circulation. The pressure in the system is monitored by a safety downward-control unit. This safety and regulating system requires three pipelines, to be precise that for the power oil, that for the safety oil circuit, and the return line into the oil draining device.

This three-pipe safety and regulating system operates reliably. The outlay for building three pipelines is, however, comparatively high and in addition the danger of leaks also increases with an increasing number of pipe connections.

SUMMARY OF THE INVENTION

Accordingly, it is the object of this invention, as defined in the claims, to provide a novel hydraulic safety and regulating system for the steam feed of a turbine which is simple to build and in which the number of possible leakage points is sharply reduced.

The advantages achieved through the invention are essentially to be seen in that there is no need to build a separate pipeline for the safety oil circuit, as a result of which the number of possible leakage points and thus the danger of fire is sharply reduced. Furthermore, there is the particularly advantageous effect that in the case of a pressure drop, for example as a consequence of a pipe fracture, the replenishment of power oil is suppressed, as a result of which consequential damage is reduced to a comparatively low extent. Despite the saving of one pipeline, a satisfactorily high dynamics of the turbine regulation is reliably guaranteed in all possible case of operation.

The further embodiments of the invention are the subjects of the dependent claims.

The invention, its further development and the advantages achievable thereby are explained in more detail below with reference to the drawings, which represent only one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
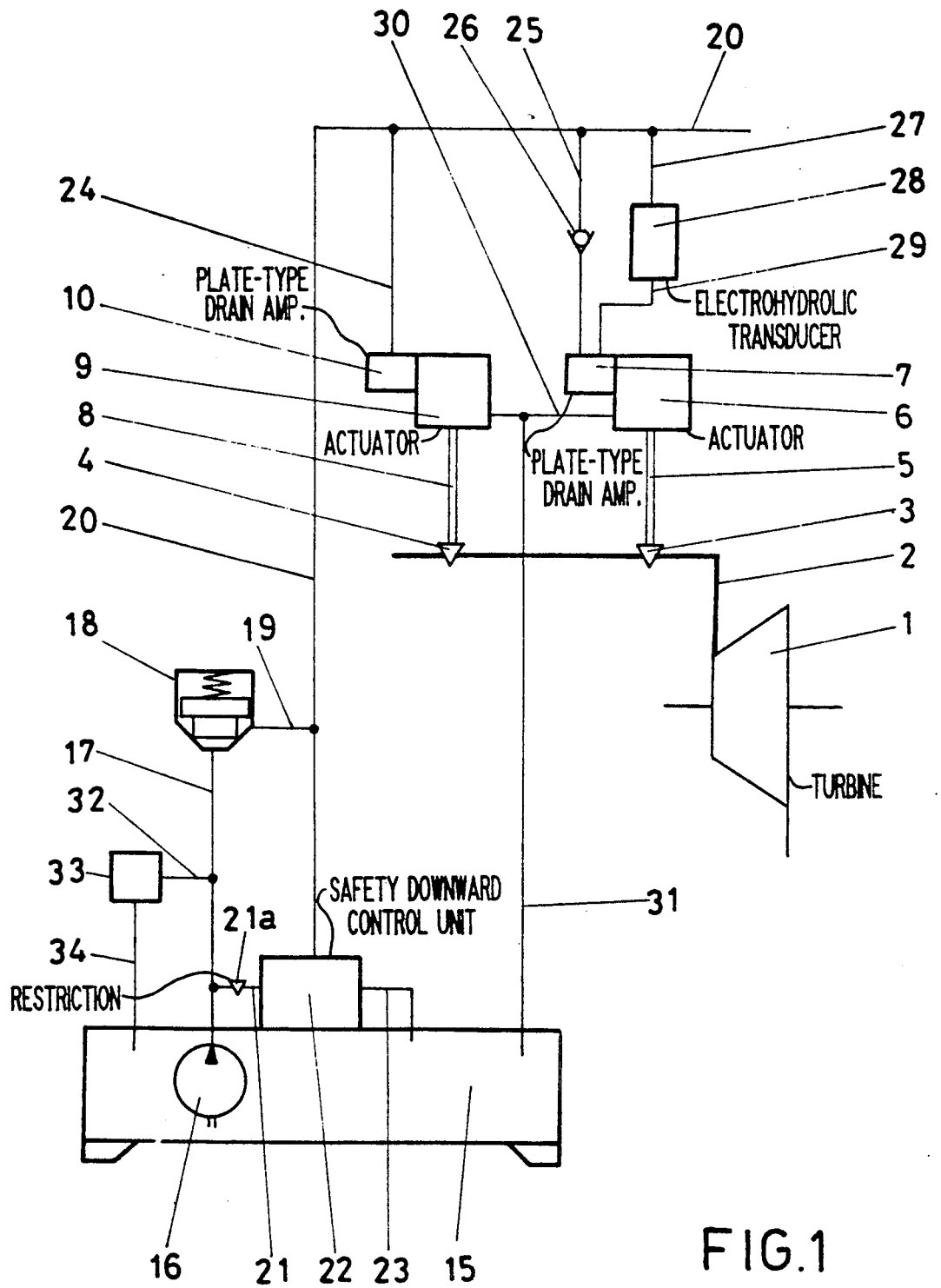
FIG. 1 shows a first embodiment of the invention.

Referring now to the drawings, wherein like reference numerals designate identical or corresponding parts throughout the several views, FIG. 1 shows a diagrammatic representation of a hydraulic safety and regulating system for the steam feed of a turbine 1. A hot-steam line 2, which can be closed by a steam-regulating valve 3 or a rapid-action valve 4, leads hot steam into the turbine 1. For the purpose of its actuation via a valve spindle 5, the steam-regulating valve 3 is assigned an actuator 6 having a plate-type drainage amplifier (also known as a plate valve) 7. For the purpose of its actuation via a valve spindle 8, the rapid-action valve 4 is assigned a rapid-action drive 9 having a plate-type drainage amplifier (also known as a plate valve) 10.

Oil is collected in an oil draining device 15, and pressurized from there by means of a pressure-regulated pump 16, and fed under pressure as power oil into a line 17. For reasons of redundancy, two pumps 16 are frequently connected in parallel. The line 17 leads into a connecting valve 18. A line 19 leads from the connecting valve 18 into a main line 20. Branching from the line 17 is a line 21, which is provided with a restrictor 21a and ends in a centrally arranged safety downward-control unit 22. It is perfectly possible to integrate the function of the restrictor 21a into the safety downward-control unit 22. A line 23 returns from the safety downward-control unit 22 into the oil draining device 15. Furthermore, the main line 20 ends in the safety downward-control unit 22. The safety downward-control unit 22 frequently contains three hydraulic valves, connected to form a 2-from-3 circuit, with electromagnetic triggering. It is, however, also possible for more than three electrohydraulic valves to be interconnected to form an arrangement acting as a 2-from-3 circuit. Furthermore, it is also possible to construct the safety downward-control unit 22 from basically different elements, and also to use different circuit variants in so doing. In case of need, the safety downward-control unit 22 controls the pressure of the power oil in the main line 20 downwards.

A tap line 24 branches from the main line 20 to the plate-type drainage amplifier 10 interacting with the rapid-action drive 9. A further tap line 25 leads to the plate-type drainage amplifier 7. Arranged in this tap line 25 is a check valve 26 which facilitates the flow of oil from the plate-type drainage amplifier 7. A further tap line 27 branches from the main line 20 further along. This tap line 27 ends in an electrohydraulic transducer 28. The electrical actuation of the transducer 28 is provided by a controller, typically an electronic control, which is master to the hydraulic safety and regulating system and is connected to the plant control system. The electrical actuation of this transducer 28 is no more represented than the controller, as a rule electronic, which is master to this hydraulic safety and regulating system and is connected to a plant control technology. The electrohydraulic transducer 28 is connected via a line 29 to the plate-type drainage amplifier 7, which interacts with the actuator 6. A line 30 connects the actuator 6 to the rapid-action drive 9 and collects the oil escaping from the two, which is led back via a connected line 31 into the oil draining device 15.

Branching from the line 17 into a pressure-relief valve 33 is a line 32 which relieves pressure surges occurring in the line 17 via a line 34 into the oil draining device 15.

Figure 2:
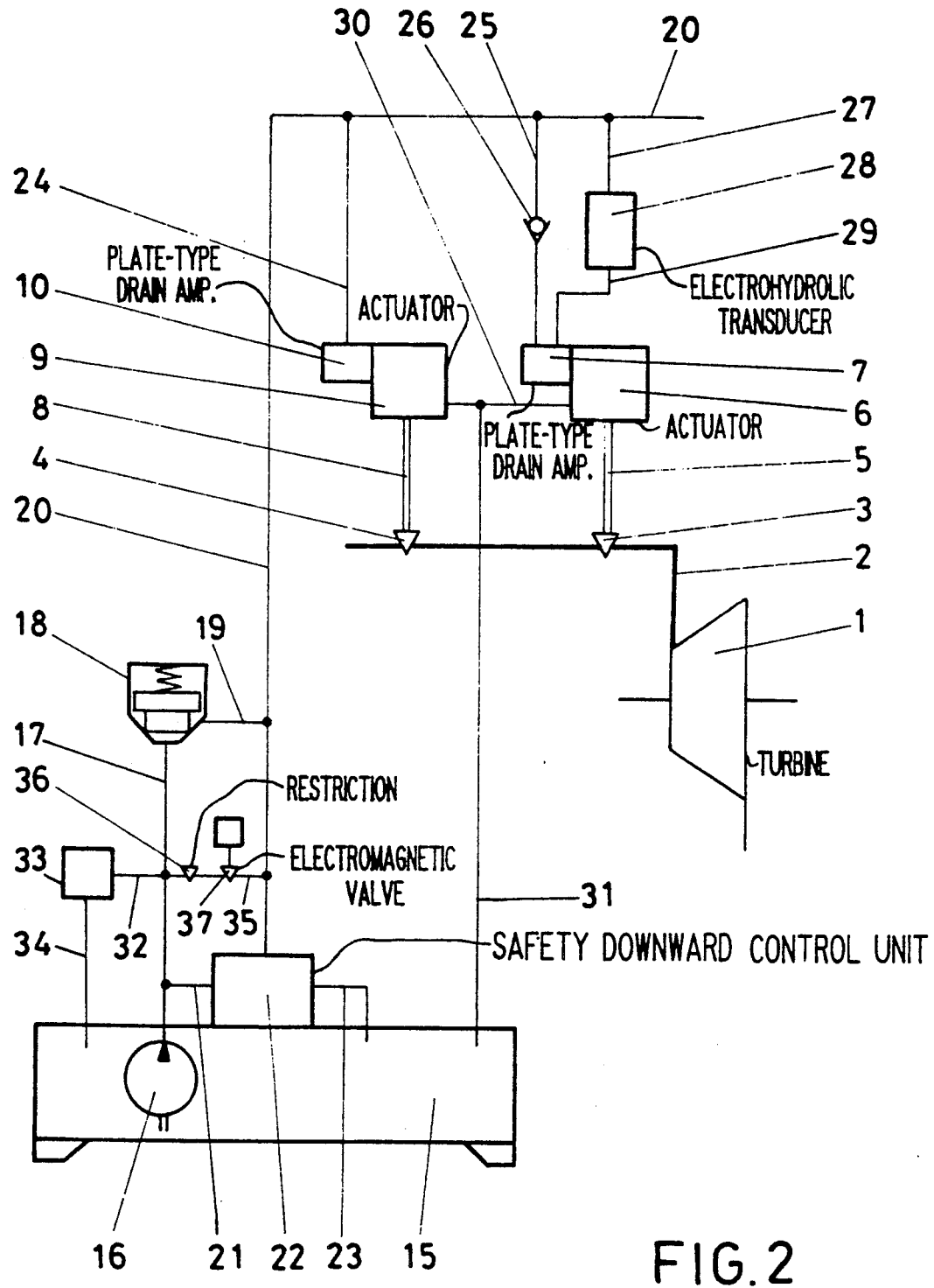
FIG. 2 shows a second embodiment of the invention.

The line 17 in FIG. 2 is connected to the main line 20 via a line 35 parallel to the line 19. The line 35 has a restrictor 36, and it can, moreover, be completely interrupted by an electromagnetic valve 37. The line 35 is used here to refill the line 20 instead of the line 21 in the embodiment in accordance with FIG. 1, so that here no restrictor is provided in the line 21. The actuation of the electromagnetic valve 37 is triggered by a master plant control system.

In both embodiments, the main line 20 leads to further hydraulic drives (not represented) which are supplied via further tap lines (likewise not represented) with power oil under pressure. In both figures, the main line 20 is represented as a single circuit from which tap lines branch off. This single-circuit construction of the main line 20 has the advantage that the same conditions always apply to all the hydraulic drives. However, it is also possible to fan the main line 20 out into subcircuits, in which case it would be necessary for this fanning out to take place in the region between the termination of the line 19 and the first tap line 24. Were two subcircuits provided, one circuit could supply the hydraulic drives of a plurality of rapid-action and steam-regulating valves via tap lines departing from it, while the other circuit could supply, for example, actuators for regulating the bleeding of steam or blow-off valves via tap lines departing from it. An attendant advantage of such fanning out is that the hydraulic safety and regulating system can be structured more clearly for a comparatively large number of drives.

Closer consideration may firstly be given to FIG. 1 in order to explain the mode of operation. When no oil pressure prevails in the main line 20, the steam-regulating valve 3 is closed together with the rapid-action valve 4, and the turbine 1 is not supplied with steam. If, now, the turbine 1 is to be run up to speed, it is firstly necessary for the main line 20 to be filled with oil under pressure. During this process, the pump 16 feeds oil under pressure through the line 17, the line 21 and the safety downward-control unit 22 into the main line 20, and refills the latter. The restrictor 21a limits the flow of oil such that no pressure surges can occur in the main line 20 and the connected tap lines 24, 27. Should air still be present in the main line 20 and in the associated tap lines 24, 27, this air passes through leakage points in the hydraulically driven devices into the lines 30 and 31 and, finally, into the oil draining device 15, from which it can escape from the system. During this process, the connecting valve 18 shuts off the line 17. Not until half the operating pressure has been reached in the main line 20 can the connecting valve 18, supported by this half the operating pressure present in the line 19, open and take over the oil replenishment. In normal operation, the oil replenishment takes place permanently through the connecting valve 18 which permanently releases a comparatively large cross-section without restrictor points. Alongside this, the amount of oil flowing through the line 21, which is, after all, strongly limited by the restrictor 21a, is negligible.

Once half the operating pressure has been reached in the main line 20, the rapid-action drive 9 is actuated via the plate-type drainage amplifier 10, and the rapid-action valve 4 is opened and remains permanently open in normal operation. The actuator 6 is not activated until the electrohydraulic transducer 28 receives an electrical signal from the master plant control technology and thereupon releases a path for the power oil to flow through under pressure from the tap line 27 into the line 29 and on from there into the plate-type drainage amplifier 7. As a rule, the master plant control system will not release this signal until total operating pressure has been reached in the main line 20. The power oil flows on from the plate-type drainage amplifier 7 into the actuator 6, and sets the latter moving in the opening direction. The steam-regulating valve 3 is likewise opened with this movement, and steam begins to flow through the hot-steam line 2 into the turbine 1, and sets the latter moving. As soon as the prescribed desired value of the amount of flowing steam is reached, the plant control system controls the electrohydraulic transducer 28 such that the amount of power oil flowing through is no longer increased and the pressure in the actuator 6 is held approximately constant. Only small deviations from the desired value are compensated in this operating condition. The oil escaping from the actuator 6 passes together with the oil escaping from the rapid-action drive 9 into the line 30 and is led back through the line 31 connected with the latter into the oil draining device. From there, the oil passes back once again via the pump 16 and the connecting valve 18 into the main line 20 and thus into the circulation.

If, in the region of the main line 20 or in the devices supplied through the latter with power oil under pressure, an impermissible leak occurs through which oil escapes, the pressure in the main line 20 falls immediately. As a consequence, the connecting valve 18 closes simultaneously and the oil replenishment is interrupted.

Due to the pressure drop in the main line 20, a pressure gradient is also produced in the tap line 25, the check valve 26 opens and oil flows off from the plate-type drainage amplifier 7, as a result of which a rapid closing movement is triggered in the actuator 6, so that the steam-regulating valve 3 likewise closes. This closing process of the actuator 6 takes place independently of the electrohydraulic transducer 28. In this process, the oil from the drive of the actuator 6 flows off through the lines 30 and 31 into the oil draining device 15.

The pressure drop in the main line 20 also acts via the line 24 on the plate-type drainage amplifier 10, which triggers a rapid response of the rapid-action drive 9, and thus a rapid closure of the rapid-action valve 4. The oil situated in the rapid-action drive 9 flows off through the lines 30 and 31 into the oil draining device 15.

The embodiment in accordance with FIG. 2 differs in the region of the oil feed from the embodiment described s far. The refilling of the main line 20 takes place through the line 35; here, the line 21 has the function only of supplying the safety downward-control unit 22 with power oil, in order in this way to ensure a satisfactory excess of power during actuation of the electrohydraulic valves operating in this unit. In this process, the restrictor 36 limits the amount of oil flowing in, so that no pressure surges can occur in the main line 20. The electromagnetic valve 37 is open during the entire filling process. As soon as half the operating pressure has been reached in the main line 20, the connecting valve 18, supported by the pressure in the main line 20, opens in this embodiment, as well, and takes over the rest of the refilling. The electromagnetic valve 37 thereafter shuts off the line 35 and remains permanently closed in normal operation. The entire replenishment of the power oil into the main line 20 takes place through the connecting valve 18 and the line 19, as already described, so that here, too, the connecting valve 18 immediately blocks the oil replenishment in the case of a pressure drop in the region of the main line. Here, too, it is advantageous that in this case no oil additionally passes into the main line 20, as a result of which only an escape of oil that is strictly limited in amount is possible in the region of a leakage point. In this embodiment as well, pressure surges occurring during downward control of the connecting valve 18 are relieved by the pressure-relief valve 33 into the oil draining device 15.

In the case of such an emergency shutdown, the fact that the oil replenishment is automatically interrupted immediately after the first indication of damage, that is to say after the pressure drop, is a particularly advantageous effect, so that only a little oil can escape from the leakage point. This substantially reduces the danger of fire in the region around the hot turbine 1. In addition, the danger of consequential damage due to further uncontrolled escape of oil is also avoided.

Where the turbine 1 is closed down for operational reasons, the actuator 6 is moved in a controlled fashion in the closing direction with the aid of the electrohydraulic transducer 28, until the steam-regulating valve 3 is closed. The system can remain in this operating condition if it is necessary to reckon with starting up the turbine 1 soon. If, however, the turbine 1 is to be shut down, after closure of the steam-regulating valve 3 by an electrical command, which is fed in from the plant control system the safety downward-control unit 22 is excited and as a result the main line 20 is relieved of pressure via the line 23. The pump 16 is also shut down by the same electrical command. In this case, as well, at the moment of pressure relief the connecting valve 18 immediately blocks the oil replenishment into the main line 20.

The safety downward-control unit 22 ensures that the turbine 1 can be run down into a controlled operating condition even in the case of a failure of the electrical power supply. Consequently, the hydraulic safety and regulating system in accordance with the present invention operates absolutely reliably both in the case of hydraulic breakdowns and in the case of breakdowns in the electrical sphere. In addition, this system is also economically advantageous, since a separate safety oil system can be saved without, however, having to renounce the advantages of this safety oil system with regard to increased operating safety. In this hydraulic safety and regulating system the safety downward-control unit 22 operates in exactly the same way as it would if it had to monitor a separate safety oil circuit.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United Stated is:

1. A hydraulic safety and regulating system for the steam feed of a turbine having at least one rapid-action valve, at least one steam-regulating valve actuated by power oil, at least one central safety downward-control unit, a line system monitored by the safety downward control unit, for the hydraulic actuation, an oil draining device and at least one pump for the power oil,
   wherein the monitored line system is designed both as a power oil supply and as a safety oil system;
   wherein the power oil is fed into a main line through a second line, through at least one connecting valve and a third line;
   and wherein the safety downward-control unit is pressurized by means of oil via a fourth line and is connected to the oil draining device via a fifth line; and
   the safety downward-control unit is directly connected to the main line.

2. A hydraulic safety and regulating system for the steam feed of a turbine having at least one rapid-action valve, at least one steam-regulating valve actuated by power oil, at least one central safety downward-control unit, a line system monitored by the safety downward control unit, for the hydraulic actuation, an oil draining device at least one pump for the power oil,
   wherein the monitored line system is designed both as a power oil supply and as a safety oil system;
   wherein the power oil is fed into a main line through a second line, through at least one connecting valve and a third line; and
   wherein the at least one connecting valve is constructed to be capable of actuation in the opening direction by a pressure produced in the second line in conjunction with a pressure prevailing in the main line.

3. A hydraulic safety and regulating system for the steam feed of a turbine having at least one rapid-action valve, at least one steam-regulating valve actuated by power oil, at least one central safety downward-control unit, a line system monitored by the safety downward control unit, for the hydraulic actuation, an oil draining device at least one pump for the power oil,
   wherein the monitored line system is designed both as a power oil supply and as a safety oil system;
   wherein the power oil is fed into a main line through a second line, through at least one connecting valve and a third line;
   wherein before the opening of the connecting valve the power oil is fed into the main line via at least one separate line; and
   the at least one separate line either leads out from the second line through the central safety downward control unit into the main line, or directly connects the second line to the main line.

4. The hydraulic safety and regulating system as claimed in claim 3, wherein
   the at least one separate line, which connects the second line directly to the main line, is constructed so that it can be shut off by an electromagnetic valve.

5. The hydraulic safety and regulating system as claimed in claim 1, wherein
   the main line has only one circuit.

6. The hydraulic safety and regulating system as claimed in claim 1, wherein
   the main line is fanned out in the region after the termination of the third line into at least two subcircuits.

7. The hydraulic safety and regulating system as claimed in claim 1, wherein
   a plate-type drainage amplifier is connected upstream of a rapid-action drive for actuating the rapid-action valve, and an electrohydraulic transducer and a plate-type drainage amplifier are connected upstream of an actuator for actuating the steam-regulating valve.

8. A hydraulic safety and regulating system for the steam feed of a turbine having at least one rapid-action valve, at least one steam-regulating valve actuated by power oil, at least one central safety downward-control unit, a line system monitored by the safety downward control unit, for the hydraulic actuation, an oil draining device at least one pump for the power oil,
 wherein the monitored line system is designed both as a power oil supply and as a safety oil system;
 wherein the power oil is fed into a main line through a second line, through at least one connecting valve and a third line;
 a plate-type drainage amplifier is connected upstream of a rapid-action drive for actuating the rapid-action valve, and
 an electrohydraulic transducer and a plate-type drainage amplifier are connected upstream of an actuator for actuating the steam-regulating valve;
 and wherein a check valve which facilitates a flow of oil from the plate-type drainage amplifier, is provided in a tap line between the plate-type drainage amplifier and the main line.

9. A hydraulic safety and regulating system for the steam feed of a turbine having at least one rapid-action valve, at least one pump for supplying power oil, at least one steam-regulating valve actuated by the power oil, at least one central safety downward-control unit, a line system monitored by the safety downward-control unit for providing the power oil to the at least one rapid action valve, and an oil draining device;
 wherein said monitored line system functions both as a power oil supply in supplying power oil to the at least one rapid-action valve, and also as a safety oil system in removing oil from a main line through said safety downward-control unit;
 and wherein the power oil is fed into the main line through a second line, through at least one connecting valve and a third line;
 and further wherein said safety downward-control unit relieves pressure in the main line, thereby also relieving pressure to the at least one steam-regulating valve such that the turbine can be shut down, and further wherein when said safety-downward control unit relieves pressure, the connecting valve is closed to prevent feeding of power oil into the main line.

10. The hydraulic safety and regulating system of claim 9, wherein the at least one connecting valve is constructed to be capable of actuation in the opening direction by a pressure produced in the second line in conjunction with a pressure prevailing in the main line.

11. The hydraulic safety and regulating system of claim 9, wherein the safety downward-control unit is pressurized by means of oil via a fourth line and is connected to the oil draining device via a fifth line; and
 wherein the safety downward-control unit is directly connected to the main line.

12. The hydraulic safety and regulating system of claim 9, wherein the main line has only one circuit.

13. The hydraulic safety and control regulating system of claim 9, wherein before the opening of the connecting valve, the power oil is fed into the main line via at least one separate line, and wherein the at least one separate line either leads out from the second line through the central safety downward-control unit into the main line, or directly connects the second line to the main line.

14. The hydraulic safety and regulating system of claim 9, wherein a plate-type drain amplifier is connected upstream of a rapid-action drive for actuating the rapid-action valve; and
 wherein an electrohydraulic transducer and a plate-type drain amplifier are connected upstream of an actuator for actuating the steam-regulating valve.

* * * * *